No. 805,273. PATENTED NOV. 21, 1905.
H. J. EISEN.
REGISTER.
APPLICATION FILED APR. 28, 1905.
3 SHEETS—SHEET 1.
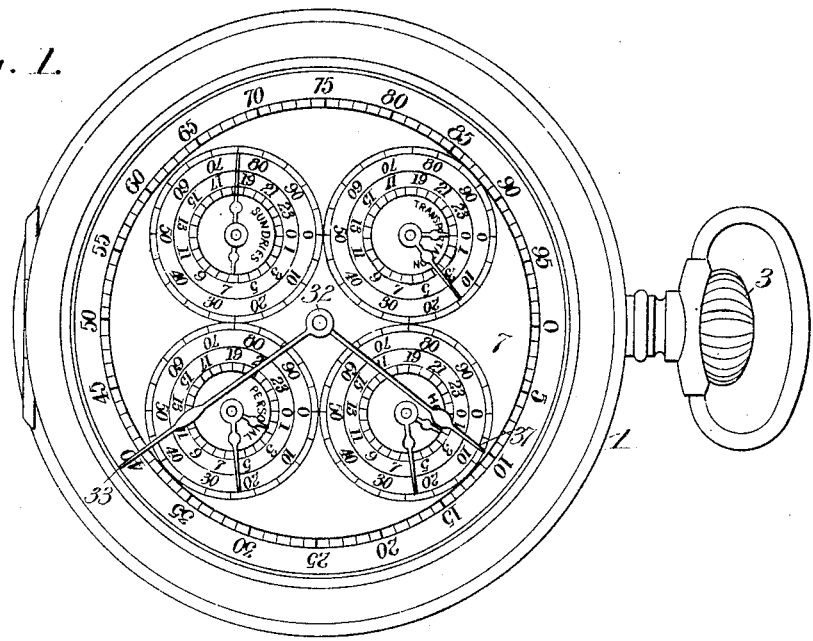
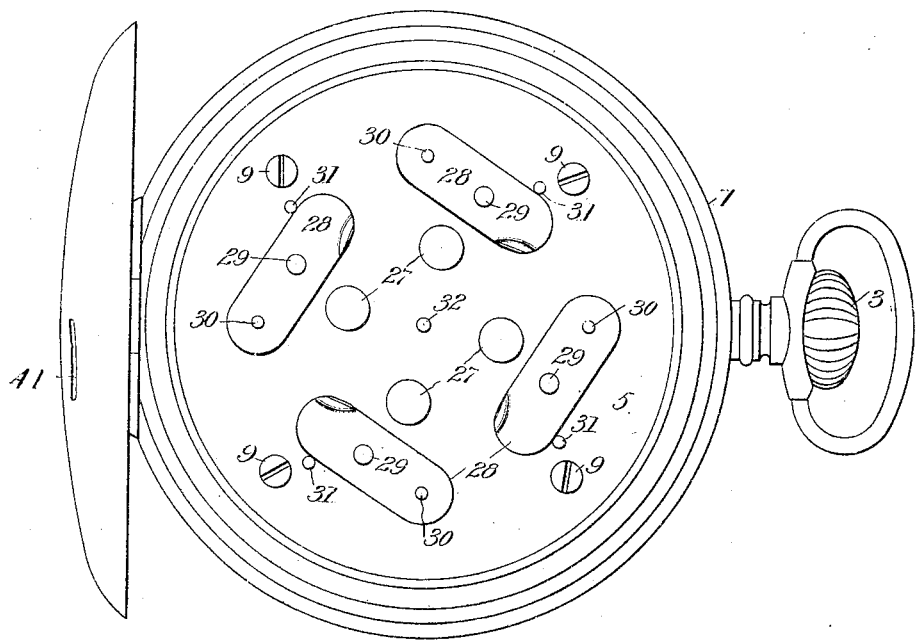
Witnesses
C. H. Walker
P. W. Buckhead
Inventor
H. J. Eisen,
By Howson & Howson,
Attorneys.

No. 805,273. PATENTED NOV. 21, 1905.
H. J. EISEN.
REGISTER.
APPLICATION FILED APR. 28, 1905.

3 SHEETS—SHEET 2.

Witnesses
Inventor
H. J. Eisen
Attorneys

No. 805,273. PATENTED NOV. 21, 1905.
H. J. EISEN.
REGISTER.
APPLICATION FILED APR. 28, 1905.

3 SHEETS—SHEET 3.

Witnesses
C. H. Walker.
P. W. Buckhead.

Inventor
H. J. Eisen,
by Howson & Howson
Attorneys

UNITED STATES PATENT OFFICE.

HERMAN J. EISEN, OF JERSEY CITY, NEW JERSEY, ASSIGNOR, BY MESNE ASSIGNMENTS, TO THE POCKET AUDITOR MFG. CO., A CORPORATION OF NEW JERSEY.

REGISTER.

No. 805,273.    Specification of Letters Patent.    Patented Nov. 21, 1905.

Application filed April 28, 1905. Serial No. 257,901.

*To all whom it may concern:*

Be it known that I, HERMAN J. EISEN, a citizen of the United States, and a resident of Jersey City, county of Hudson, State of New Jersey, have invented certain new and useful Improvements in Registers, of which the following is a specification.

My invention relates to that class of registers which are intended to be used by traveling men and others for keeping accounts of expenditures. In devices of this class there is usually a main dial and pointer or pointers for keeping account of the total expenditures and a series of subordinate dials, each with its appropriate pointer or pointers for keeping account of different classes of expenditures, with connections between the main spindle and the subordinate spindles, whereby the operation of any selected one of the latter will cause the former to rotate, and thus register on the main dial the total expenditures. Devices of this character have been provided with an operating-spindle like the ordinary spindle or stem of a watch, and each movement of this spindle is registered on the totaling-dial and likewise correspondingly registered on one or the other of the subordinate dials, depending upon the class of expenditures of which the record is being kept.

My present invention consists of simple and effective means for connecting the registering element of any selected one of the subordinate dials with the main operating-spindle or gear-train, as hereinafter described with reference to the accompanying drawings, and more particularly pointed out in the claims.

Figure 3:
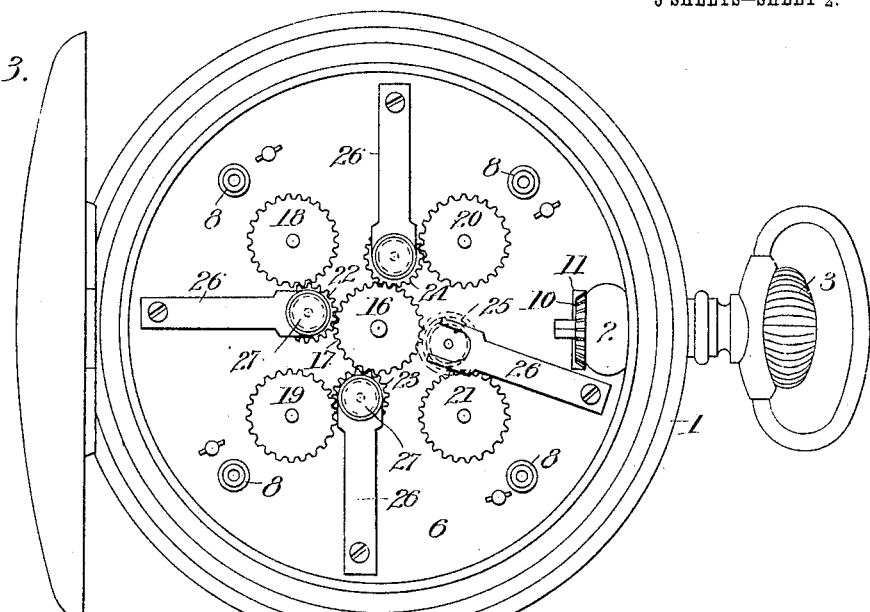
Figure 4:
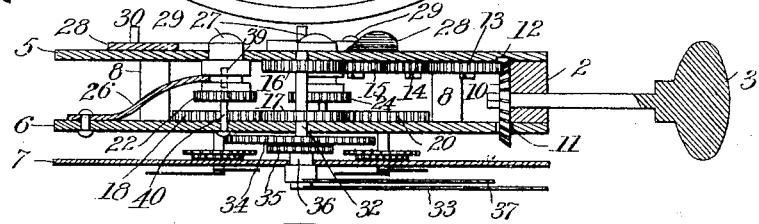
Figure 5:
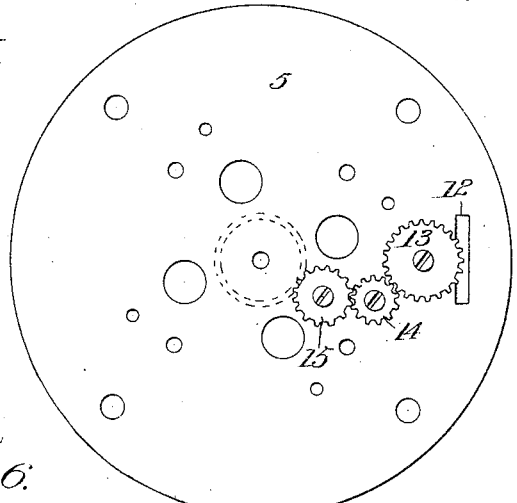
Figure 6:
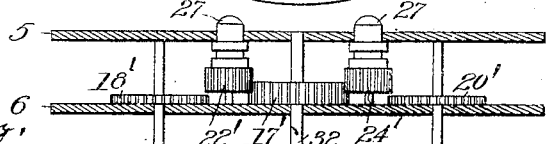
Figure 7:
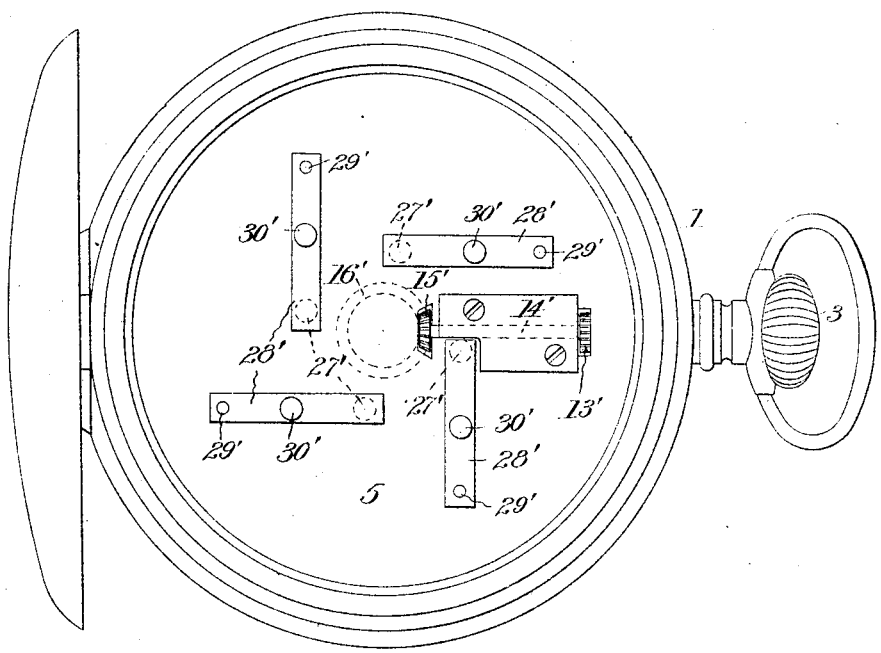
Figure 8:
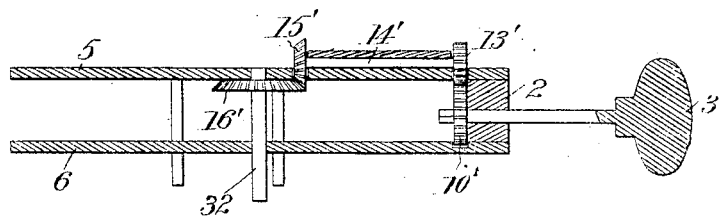

In the drawings, Figure 1 is a face view of a device embodying my invention, showing the dial-face. Fig. 2 is a rear view with back cover open. Fig. 3 is a similar view with back plate removed. Fig. 4 is a transverse section with the operating elements in elevation and removed from the case. Fig. 5 is an inside view of the back-supporting plate. Fig. 6 is a detail, partly in section, of a modification hereinafter referred to. Fig. 7 is a plan view of another modification; and Fig. 8 is a detail thereof, partly in section.

Referring to the drawings, in which the same reference characters relate to the same or corresponding parts in all the views, the numeral 1 indicates a case, preferably an ordinary watchcase, in which the operating elements are supported by two plates 5 and 6, which are secured together by set-screws 9, passing through the plate 5 and engaging sockets in posts 8, projecting from the plate 6, and the dial-plate 7 is attached to the latter plate by any suitable means. Mounted on the inside of the plate 5 is the main operating train of gearing 13, 14, and 15, the latter meshing with a gear on the main-dial spindle 32 and the former with the bevel-gear 10. This bevel-gear 10 has a bearing against the face of a lug 2, projecting from the plate 6, and extends through a slot 11 in the plate 6 and into a recess 12 in the plate 5. This gear is provided with a polygonal hole through its center through which extends the operating-stem 3, provided with a crown, said stem being similar to the ordinary winding-stem of a watch supported in the usual pendant. The lower end of this stem is squared, as shown, while the body is round, so that when the stem is pulled outwardly the squared portion will engage the polygonal hole in the gear 10, thus clutching the latter to the stem; but when the stem is pushed in the squared portion is disengaged from the bevel-gear, thus disengaging the latter from the stem. By this construction rotation of the stem 3 when clutched to the gear will impart, through the train 13, 14, and 15, motion to the gear 16, and thereby turn the main spindle 32, on which the units-pointer 33 of the totaling-dial is mounted. Any well-known form of reducing-gearing train may be used between the units-spindle 32 and the multiple-spindle 36, the latter of which consists of a hub 36, mounted on the spindle 32 and carrying the multiple-pointer 37, the first and last gears in the reducing-trains 34 and 35, respectively, mounted on the main spindle 32 and the multiple-spindle 36, the intermediate gears not being shown. The subordinate-dial spindles are provided with gears 18, 19, 20, and 21, having the same number of teeth as the gear 17, which is mounted on the main-dial spindle and serves as the driving-gear for the several subordinate-dial spindles, as hereinafter described.

Pinions 22, 23, 24, and 25, carried by hubs 27, slidably mounted on stems 40, fixed to the plate 6, are normally held out of engagement with the corresponding gears 18, 19, 20, and 21 of the subordinate-dial spindles and the driving-gear 17 of the main-dial spindle by spring-arms 26, in the forked ends of which the said hubs are mounted, a groove in the hubs 27 engaging the said forked end of each arm. The ends of the hubs are rounded, as shown in Fig. 4, and normally project beyond the surface of the plate 5, so that said rounded ends will be in the path of a lever 28, pivoted at 29 to the plate 5, the advancing edge of which lever 28 is slightly upturned, as shown, to permit the lever to ride over the projecting end of the hub as said lever is swung toward the same by means of the pin 30 or other suitable operating means. If desired, the pins 30 may be long enough to project through slots 41 (see Fig. 2) in the cover, so that the levers may be operated without opening said cover. These levers in normal position bear against stop-pins 31, as shown in Fig. 2, from which position any selected lever may be swung toward the corresponding hubs 27, and riding over the end of the same the hub will be depressed, thereby moving the pinion, as 22, for example, axially into engagement with the gears 17 and 18, in which position rotation of the total-dial spindle through means hereinbefore described will cause a similar motion of rotation to be imparted to the subordinate-dial spindle upon whose dial the desired expenditure is to be registered. Each subordinate-dial spindle has a corresponding pinion 23, 24, or 25 similarly mounted and operated to the pinion 22, and hence for every unit registered on a subordinate dial a corresponding amount is registered on the total-dial, so that the subordinate dials will show the itemized accounts, as "Travel," "Hotel," "Personal," "Sundries," and the like. The units and multiplying pointers of the subordinate dials may be connected together by any suitable form of reducing-gearing familiar to those skilled in the art, as in former devices of this kind, and not deemed necessary to show herein, the gears on the units and multiplying spindles being indicated similar to the gears 34 and 35 on the main-dial spindles.

Instead of the pinions 22, 23, 24, and 25 in normal position being out of mesh with the gears 17 and 18, &c., I may arrange these parts as shown in Fig. 6, where the thickness of the pinions 22' 24', &c., and gear 17' are slightly increased, so that the pinions 22' 24', &c., will at all times mesh with the gear 17' and be normally out of mesh with the corresponding subordinate-dial gears 18' 20', &c.

In Fig. 7 I have shown a modification of the gearing for driving the totaling or main dial spindle, wherein the bevel-gear 10 is replaced by a spur-gear 10', which meshes with a pinion 13' on a shaft 14', rotatably mounted in a bearing-plate on the outside of the back plate 5. This shaft has a bevel-pinion 15', which meshes with a bevel-gear 16' on the main-dial spindle 32, the back plate being slotted, as shown, to permit the pinions 13' or 15' to extend therethrough.

Instead of the levers for moving the pinion-hubs 27 to bring the itemizing-dial gears into mesh with the main-dial gear I may employ spring-stops 28', Fig. 7, having their ends extending over the hubs 27' and having pins 30' projecting therefrom, arranged concentrically with respect to the main-dial spindle. Whenever it is desired to register on any particular itemizing-dial, pressure upon the pin 30' corresponding to said dial will depress the spring-stop 28', and thereby the hub 27', and thus bring the pinion on said hub into engagement with the totaling and itemizing dial spindles, as in the previously-described construction.

I claim as my invention—

1. In a register, the combination with the main-dial spindle and subordinate-dial spindles, of gearing for operating said main-dial spindle, mechanism for manually operating said gearing at will, whereby the main-dial spindle may be operated to register on the main dial, a gear on the main-dial spindle, a gear on each of the subordinate-dial spindles, a spring-arm carrying a pinion for connecting the gear on the main-dial spindle with the gear on the subordinate-dial spindles and holding said pinion normally out of operative connection, and means for moving said spring-arm to cause the pinion to connect the gears of the main and subordinate dial spindles, substantially as described.

2. In a register, the combination with the main-dial spindle and subordinate-dial spindles, of gearing for operating said main-dial spindle, mechanism for manually operating said gearing at will, whereby said main-dial spindle may be operated to register on the main dial, a gear on the main-dial spindle, a gear on each of the subordinate-dial spindles, a spring-arm for each subordinate-dial spindle, a pinion carried by each of said spring-arms and normally disconnected from the subordinate-dial gear, a lever for each pinion adapted to be moved so as to press the pinion into operative engagement with the gears on the main and subordinate dial spindles, substantially as described.

3. In a register, the combination with the main and subordinate dial spindles, of normally inactive gearing for operating its main-dial spindle, means for manually operating said gearing at will, subordinate-dial spindles, gears on each of said spindles, pinions axially slidable into and out of engagement with said gears, spring-arms normally holding said pinions out of operative connection with the subordinate-spindle gears, and levers for moving said pinions axially into operative connection with any selected one of said subordinate-spindle gears and the main-spindle gear, substantially as described.

4. In a register, the combination with supporting-plates, a main-dial spindle, gearing on one of the supporting-plates for operating the main-dial spindle, a bevel-gear meshing with said gearing, and an operating-stem for rotating said bevel-gear at will, whereby the main-dial spindle may be operated at will, of a subordinate-dial spindle journaled on said plates, a gear on said latter spindle, a spring-arm fixed to one of the plates, a hub carried by said spring-arm having one end normally projecting through a hole in one of the plates and a pinion on the hub normally held out of operative engagement with the subordinate-dial-spindle gear, a lever pivotally supported on said latter plate and adapted to move over the end of the hub, whereby the pinion carried thereby may be pressed into operative connection with the subordinate-dial-spindle gear and the main-spindle gear, substantially as described.

5. In a register, the combination with two supporting-plates, a main-dial spindle, operating-gearing on one of said plates for operating the main-dial spindle, means for manually operating said gearing at will, of subordinate-dial spindles, a gear on each of said spindles normally disconnected from the gear on the main spindle, a pinion slidably mounted between the gear on the main spindle and each of the gears on the subordinate-dial spindles, a spring-arm for each of the subordinate-dial spindles fixed to one of the plates and normally holding the pinions out of operative connection with the subordinate and main dial gears, and lever mechanism for moving any selected one of said pinions into operative connection with the gear on the main spindle and the gear on one of the subordinate-dial spindles, substantially as described.

In testimony whereof I have signed my name to this specification in the presence of two subscribing witnesses.

HERMAN J. EISEN.

Witnesses:
  DONALD FINDLEY,
  HENRY HACHMUTH.